United States Patent [19]

Fedter et al.

[11] Patent Number: 4,917,293
[45] Date of Patent: Apr. 17, 1990

[54] HEATING AND/OR AIR CONDITIONING APPARATUS FOR MOTOR VEHICLES

[75] Inventors: Horst Fedter, Bühlertal; Werner Grünwald, Gerlingen; Peter Nolting, Bühlertal, all of Fed. Rep. of Germany

[73] Assignee: Robert Bosch GmbH, Stuttgart, Fed. Rep. of Germany

[21] Appl. No.: 276,053

[22] PCT Filed: Jun. 4, 1987

[86] PCT No.: PCT/DE87/00255
§ 371 Date: Nov. 14, 1988
§ 102(e) Date: Nov. 14, 1988

[87] PCT Pub. No.: WO88/00536
PCT Pub. Date: Jan. 28, 1988

[30] Foreign Application Priority Data

Jul. 17, 1986 [DE] Fed. Rep. of Germany ....... 3624171

[51] Int. Cl.⁴ .......................... F25B 29/00; F24F 7/00
[52] U.S. Cl. .................................... 236/49.3; 165/16; 62/176.6; 98/2.01
[58] Field of Search ................... 165/16, 43; 62/176.6; 98/2.08, 2.01; 236/49.3, 91 C

[56] References Cited

U.S. PATENT DOCUMENTS 4,362,026 12/1982 Miller ............................... 165/16 X
4,424,933 1/1984 Sutoh et al. ....................... 165/43 X
4,760,772 8/1988 Horiguchi et al. ................. 98/2.01

Primary Examiner—William E. Wayner
Attorney, Agent, or Firm—Michael J. Striker

[57] ABSTRACT

A heat and/or air conditioning apparatus for a motor vehicle comprising control means and a first humidity sensor located in the interior of the motor vehicle, a second temperature sensor and a second humidity sensor located outside of the vehicle, intake duct means for supplying outside air to the vehicle interior, at least two discharge ducts located in the vehicle interior and of which at least one opens in the vicinity of a vehicle window, and a blower.

9 Claims, 1 Drawing Sheet

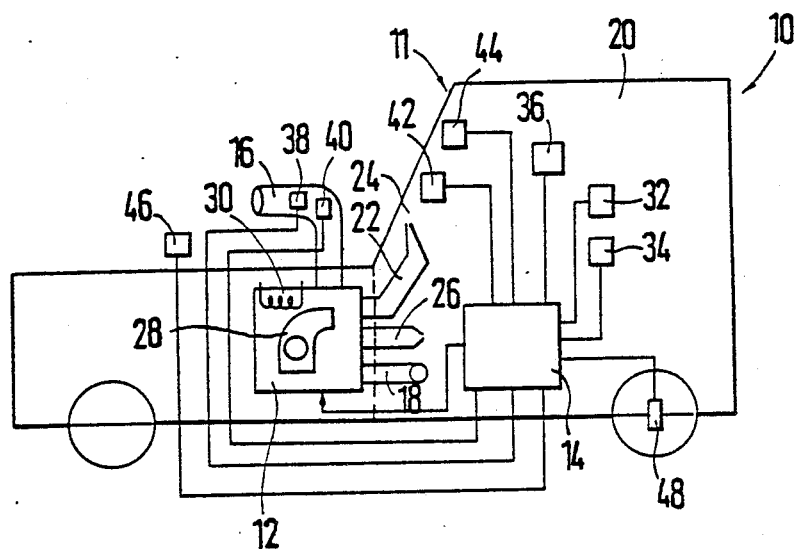

HEATING AND/OR AIR CONDITIONING APPARATUS FOR MOTOR VEHICLES

BACKGROUND OF THE INVENTION

The invention relates to a heating and/or air conditioning apparatus for motor vehicles. Such an apparatus is known from EP-A 130,528, for example. In the known apparatus, the interior temperature of the motor vehicle is regulated to a desired or to a necessary value. In order to measure the temperature, a temperature sensor is provided in the head space and a temperature sensor is provided in the foot space. The output signals of the two sensors are applied to a regulating circuit as a function of the exterior temperature. However, regulation to a specific temperature is not synonymous with the provision of comfortable interior atmosphere, because further influencing parameters in addition to the temperature must be taken into consideration when assessing the atmosphere.

SUMMARY OF THE INVENTION

In the heating and/or air conditioning apparatus for motor vehicles according to the invention, in addition to the temperature detection, at least one humidity sensor is also provided to detect the relative air humidity. The humidity sensor permits to regulate the interior atmosphere to a comfortable manner in a simple manner.

An arrangement of a temperature sensor and a humidity sensor in the proximity of a window permits the detection of an impending drop below the dew point, which results in condensation on the windows. Appropriate countermeasures can thereupon be initiated.

A further improvement in the detection of an imminent drop below the dew point is achieved by the use of an exterior temperature sensor and/or a radiation sensor.

The admission and injection of a humid cold air stream into the interior passenger space is avoided if the humidity sensor is arranged in the intake duct of the air conditioning installation or externally to measure the relative ambient air humidity.

Further particulars and advantageous of the apparatus according to the invention will appear from the description that follows with reference to the appended drawing.

BRIEF DESCRIPTION OF THE DRAWING

The single FIGURE shows a heating and/or air conditioning apparatus installed in a motor vehicle with a regulating unit associated with the air-conditioning apparatus.

DESCRIPTION OF THE PREFERRED EMBODIMENT

The FIGURE shows a heating and/or air conditioning apparatus 12, with which a regulating unit 14 is associated, arranged in a motor vehicle 10. The admission of air occurs through a first intake duct 16, which opens outside of the vehicle, as well as through a second intake duct 18, which opens into the interior 20 of the motor vehicle 10. At least two interior ventilation ducts are provided, of which a first ventilation duct 22 opens in the vicinity 24 of a window 11, and a second ventilation duct 26 opens into vehicle interior 20. Air current in the ducts 16, 18, 22, 26 is created by dynamic pressure during displacement or by a blower 28 of the apparatus. If necessary, heating means or cooling means 30 performs heating or cooling of the air delivered into the interior 20. The apparatus 12 is controlled by the regulating unit 14. The regulating unit 14 determines whether the blower 28 and/or the heating unit/cooling means 30 is switched on, whether the exterior air is to be admitted through the first intake duct 16 or interior air through the second intake duct 18, and whether the ventilation is to occur through the first ventilation duct 22 and/or the second ventilation duct 26. The signal of a plurality of sensors are fed to the regulating unit 14 for the purpose of performing the regulation function.

A first temperature sensor 32 and a first humidity sensor 34 are arranged in the interior 20. Regulation of the interior atmosphere to a comfortable level is already possible with these two sensors 32, 34. First, of all a desired temperature is input through an input device 36. In principle, the presetting of a desired relative air humidity could also be provided. However, operating errors cannot be excluded in this mode of operation without precise knowledge of the relationship between temperature and relative air humidity for a comfortable atmosphere. It is therefore more expedient if the regulating unit 14 can independently determine an admissible range for the relative air humidity as a function of the input temperature. This relationship can be obtained, for example, from the technical journal "Gesundheitsingenieur", Vol. 89, No. 10, page 301–308, 1986. The relationships found empirically between the temperature and the relative air humidity for a comfortable atmosphere are stored as a table in a signal processing unit within the regulating unit 14. Because a range of values of the relative air humidity for a comfortable atmosphere is associated with a specific temperature, the particular value of the relative air humidity to be regulated, which can be obtained with the minimum outlay of energy of the installation 12, is determined as a function of the measured air humidity.

One possibility of regulation in the case of rising air humidity is to lower the interior temperature within a tolerance band which is still acceptable to the operator. A second possibility for the air humidity to be lowered is by circulating air having a constant temperature. For this purpose, the apparatus 12 admits the interior air through the second intake duct 18 which opens into the interior 20, dehumidifies it and delivers it back through the first ventilation duct 22 and/or the second ventilation duct 26 into the interior 20. A third possibility is for additional exterior air to be admixed with the interior air. In this case, it is expedient to measure the temperature of the exterior air with a second temperature sensor 38 and the air humidity of the exterior air with a second humidity sensor 40 and, if necessary, to perform heating or cooling and/or dehumidification of the admitted air in the apparatus 12. It is particularly favourable to install the second temperature sensor 38 and the second humidity sensor 40 in the first intake duct 16. The two sensors 38, 40 may, however, also be installed at another suitable point externally. When air circulates, the blower 28 is responsible for air circulation. During driving, the dynamic pressure may already be adequate for air admixture.

In addition to influencing the interior atmosphere as a function of the temperature and of the relative air humidity, the heating and/or air conditioning apparatus may also be used to detect a possible or already existing condensation on the insides of the windows and to initiate appropriate countermeasures. The first ventilation duct 22, a third temperature sensor 42, a third humidity sensor 44, a radiation sensor 46 and a speed sensor 48 are provided to perform this function.

The air can absorb humidity dissolved as water vapour up to a quantity which is a function of the temperature. The warmer the air is, the greater is its absorptivity. If the air enclosed in the interior 20 cools down, it may fall below the saturation point, the dew point. Water condenses on cooled surfaces. This effect occurs in a particularly troublesome way on the interior surfaces of the windows 11.

The relationship between relative air humidity, temperature and a drop below dew point is stored in a table in the signal processing device in the regulating unit 14. An imminent or already existing drop below the dew point is already detectable by the two sensors 42, 44 which are arranged in window proximity 24.

A drop below the dew point can be prevented by countermeasures. As a first measure, the blower 28 is switched on, to direct an air stream through the first ventilation duct 22 which opens at window edge 24, to the windows 11. If the window ventilation is performed in air circulating operation, then the heating means 30 for the circulated air and/or a dehumidification will be necessary. Only the warmed air is capable of absorbing a greater quantity of water vapour. The heating means 30 may be omitted if exterior air is admitted through the first intake duct 16 and injected through the first ventilation duct 22 into the interior. Even if the exterior air has relative air humidity of virtually 100%, an anticondensation effect occurs if the interior temperature is only a few degrees higher than the exterior temperature. A preliminary treatment of the admitted air in the installation 12 is optionally possible by means of the second temperature sensor 38 and the second humidity sensor 40, which are arranged in the first intake duct 16.

The third temperature sensor 42 in the vicinity 24 may be omitted if the window temperature is determined from a correlation between the exterior temperature and the interior temperature. In this case, the second temperature sensor 38 is required. This sensor, as already described, is arranged in the first intake duct 16 or at another suitable point externally. Deducing the window temperature from the measurement of the exterior temperature and interior temperature is improved if the irradiated heat is taken into consideration. The radiation is detected by the radiation sensor 46, which must be installed on an upwardly clear surface of the motor vehicle 10. An additional improvement of the window temperature estimation is possible by the detection of the travelling speed with a speed sensor 48. This sensor is generally present in any case. An increasing travelling speed causes an increase in the air exchange on the exterior surface of the windows 11 and, therefore, leads to an approximation of the exterior surface temperature of the windows 11 to the exterior temperature. If, for example, the exterior temperature is lower than the interior temperature, then with increasing travelling speed, the window temperature decreases and the danger of a drop below the dew point is correspondingly increased. The requisite countermeasures to prevent a drop below the dew point on the windows 11 can therefore be initiated in good time.

We claim:

1. A climate control apparatus for a motor vehicle having an interior and a window, said apparatus comprising a first temperature sensor to be located in the vehicle interior for sensing a temperature therein; a first humidity sensor to be located in the vehicle interior for sening humidity therein; a second temperature sensor to be located outside of the vehicle interior for sening a temperature outside the vehicle, a second humidity sensor to be located outside of the vehicle interior for sensing humidity of air outside the vehicle; a heat radiation sensor; intake duct means for supplying the outside air into the vehicle interior; at least two discharge ducts for discharging air into the vehicle interior, at least one of said ducts opening in a vicinity of a vehicle window, a blower for directing air through said discharge ducts; and control means for controlling air flow through said intake duct means and said discharge ducts and for controlling operation of said blower in accordance with readings of said first and second temperature and humidity sensors, and said heat radiation sensor, said first and second temperature and humidity sensors and said heat radiation sensor providing for determination of a temperature in a vicinity of the vehicle window.

2. An apparatus according to claim 1 wherein said second temperature sensor is located in said intake duct means.

3. An apparatus according to claim 1 wherein said second humidity sensor is located in said intake duct means.

4. An apparatus according to claim 1 further comprising a third humidity sensor to be located in the vicinity of vehicle window.

5. An apparatus according to claim 1 comprising a third temperature sensor to be located in the vicinity of vehicle window.

6. An apparatus according to claim 1 comprising at least one sensor for sensing vehicle speed to determine a temperature outside the window in accordance with the vehicle speed.

7. An apparatus according to claim 1 wherein said apparatus comprises an input device, said control means being connected to said input device to preset predetermined temperature and relative air humidity values.

8. An apparatus according to claim 1 comprising means for adjusting the temperature of air directed into the vehicle interior.

9. A climate control apparatus for a motor vehicle having an interior, said apparatus comprising a first temperature sensor to be located in the vehicle interior for sensing a temperature therein; a first humidity sensor to be located in the vehicle interior for sensing humidity therein; a second temperature sensor to be located outside of the vehicle interior for sensing a temperature outside the vehicle; a second humidity sensor to be located outside of the vehicle interior for sensing humidity of air outside the vehicle; a vehicle speed sensor; intake duct means for supplying the outside air into the vehicle interior; at least two discharge ducts for discharging air into the vehicle interior, at least one of said ducts opening in a vicinity of a vehicle window; a blower for directing air through said discharge ducts; and control means for controlling air flow through said intake duct means and said discharge ducts and for controlling operation of said blower in accordance with readings of said first and second temperature and humidity sensors and said vehicle speed sensor.

* * * * *